(12) United States Patent  
Nakazawa

(10) Patent No.: US 7,497,551 B2
(45) Date of Patent: Mar. 3, 2009

(54) INK-JET RECORDING DEVICE WITH MIST ADSORBING CAPABILITY

(75) Inventor: Yusuke Nakazawa, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 155 days.

(21) Appl. No.: 11/458,129

(22) Filed: Jul. 18, 2006

(65) Prior Publication Data

US 2007/0046764 A1 Mar. 1, 2007

(30) Foreign Application Priority Data

Aug. 23, 2005 (JP) ............................. 2005-240927

(51) Int. Cl.
B41J 2/165 (2006.01)
(52) U.S. Cl. .......................................... 347/34; 347/22
(58) Field of Classification Search ............... 347/5, 347/9, 29–34, 74, 77, 101, 102, 22, 36, 23
See application file for complete search history.

(56) References Cited

U.S. PATENT DOCUMENTS 6,092,890 A * 7/2000 Wen et al. .................... 347/101
6,592,211 B2 * 7/2003 Swenson ...................... 347/74
6,623,113 B2 * 9/2003 Yamada et al. ................ 347/77
6,767,087 B2 * 7/2004 Yamada et al. ................ 347/77
6,886,908 B2 * 5/2005 Takahashi et al. ............. 347/34
6,953,245 B2 * 10/2005 Shirakawa ................... 347/102
7,052,109 B2 * 5/2006 Unosawa ...................... 347/34
2003/0011670 A1 1/2003 Shirakawa
2006/0055730 A1 * 3/2006 Ono et al. ..................... 347/36

FOREIGN PATENT DOCUMENTS

JP 2003237110 A * 8/2003
JP 2004-188919 A 7/2004
JP 2004330446 A * 11/2004
JP 2005-131922 A 5/2005

OTHER PUBLICATIONS

SIPO Office Action dated May 16, 2008 CN2006-1012164.8.

* cited by examiner

*Primary Examiner*—Hai C Pham
(74) *Attorney, Agent, or Firm*—Sughrue Mion, PLLC

(57) ABSTRACT

An ink-jet recording device includes: an ink-jet head that ejects an ink toward a recording medium, the ink curable by irradiating with an actinic energy ray to form an image on the recording medium, and a mist adsorbing portion that is disposed in the vicinity of the ink-jet head and that electrostatically adsorbs an ink mist produced by ejecting the ink from the ink-jet head.

8 Claims, 4 Drawing Sheets

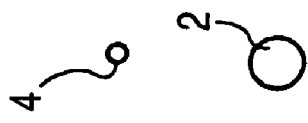
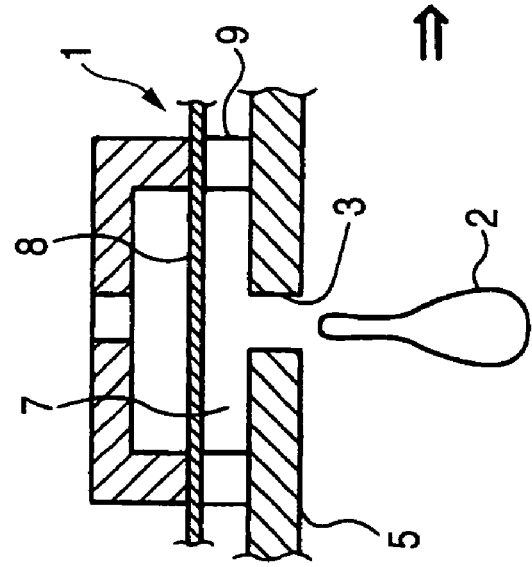
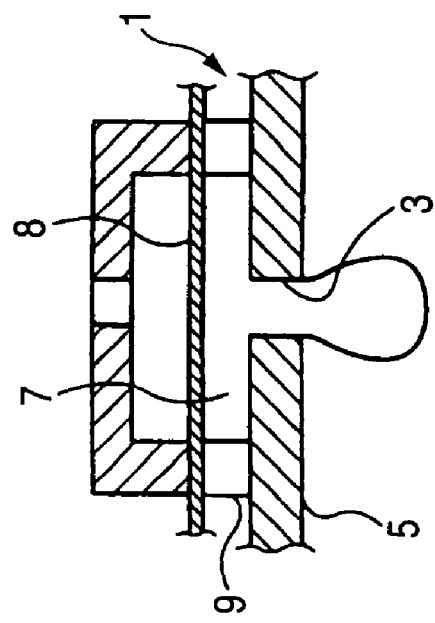

INK-JET RECORDING DEVICE WITH MIST ADSORBING CAPABILITY

BACKGROUND OF THE INVENTION

1. Field of the Invention

The present invention relates to an ink-jet recording device using an ink that cures when irradiated with an actinic energy ray such as electron ray and ultraviolet ray and more particularly to a technique for coping with ink mist produced during an ejection of an ink droplet.

2. Background Art

In recent years, there has been proposed an ink-jet recording device (hereinafter also referred to as "actinic energy ray-curing ink-jet recording device") which ejects onto a recording medium an ink that cures when irradiated with the actinic energy ray such as electron ray and ultraviolet ray using an ink-jet head and then emits energy onto the ink so that the ink is cured to form an image. The ink for use in the actinic energy ray-curing ink-jet recording device has characteristics satisfying the requirements that they cope with high speed recording on various recording media, show little bleeding to give a high precision image and be environmentally friendly. In particular, ink-jet recording devices using an ink that cures when irradiated with ultraviolet ray as actinic energy ray have industrially high applicability from the standpoint of compactness and thus are under development.

The ink-jet recording device comprises a plurality of piezoelectric elements, a diaphragm for transmitting oscillation generated by the piezoelectric elements, and a substrate having a plurality of nozzle holes corresponding to the piezoelectric elements for ejecting an ink droplet through the nozzle holes according to the oscillation of the diaphragm.

FIGS. 6A and 6B each are a schematic sectional view that illustrates the configuration of a nozzle of ink-jet head which ejects an ink. FIG. 6C is a side view that illustrates the shape of an ink droplet.

As illustrated in FIG. 6A, the substrate 1 comprises a nozzle plate 5 having a plurality of nozzle holes 3 formed therein and a channel forming member 9 defining a channel 7 communicating to the nozzle hole 3. When a voltage is applied to a piezoelectric element (not illustrated), the forward end of the piezoelectric element shows displacement in the thickness direction of a diaphragm 8. This displacement causes the change of the volume in the channel 7. As a result, the pressure in the channel 7 rises to cause an ink droplet 2 to be ejected through the nozzle hole 3 corresponding to the channel 7 as illustrated in FIG. 6B.

Since the curable ink has a relatively high viscosity, some part of the ink droplet 2 for image formation cannot fully follow the main body of the ink droplet 2 at the time when the ink droplet 2 is ejected and leave the nozzle hole, causing the simultaneous production of an unnecessary ink droplet 4 having a size of about 5 µm or less called "satellite" as illustrated in FIG. 6C. This satellite 4 can difficulty fly straight. As a result, the satellite 4 can be attached to image areas not related thereto or becomes an ink mist that can deteriorate the image quality or can be attached to totally unexpected sites on platen, nozzle plate and curing light source to impair the picture drawing stability. In particular, when recording is effected at a high speed, the produced amount of mist rises.

In order to solve this problem, JP-A-2004-188919 (the term "JP-A" as used herein means an "unexamined published Japanese patent application) discloses an actinic energy ray-curing ink-jet recording device which comprises a light-transmitting member detachably provided on the surface of an ink curing light source so that whenever the ink mist is attached to the light-transmitting member to reduce the amount of light, the light-transmitting member is renewed to prolong the life of the light source. Further, JP-A-2005-131922 discloses an actinic energy ray-curing ink-jet recording device which comprises a recording medium destaticizer provided on the ink-jet head carriage so that unnecessary attachment of mist to the recording medium can be prevented.

However, the related art techniques disclosed in the above cited patents find some difficulty in fully removing the effect of mist. When the mist is attached to unnecessary sites on the recording medium, the image quality is deteriorated. When the mist is attached to the nozzle plate, the nozzle hole is clogged to cause malejection leading to the deterioration of picture drawing stability.

SUMMARY OF THE INVENTION

An object of the invention is to provide an actinic energy ray-curing ink-jet recording device using an actinic energy ray-curing ink capable of removing mist to eliminate the adverse effect of mist (unnecessary attachment or nozzle clogging), thereby enhancing the quality of image thus formed and the picture drawing stability.

The aforementioned object of the invention can be accomplished by the following constitutions.

(1) An ink-jet recording device comprising: an ink-jet head that ejects an ink toward a recording medium, the ink curable by irradiating with an actinic energy ray to form an image on the recording medium, and a mist adsorbing portion that is disposed in the vicinity of the ink-jet head and that electrostatically adsorbs an ink mist produced by ejecting the ink from the ink-jet head.

In accordance with the ink-jet recording device, ink mist produced by the ejection of an ink is electrostatically charged so that it is adsorbed to the mist adsorbing portion by the electrostatic force acted on the mist adsorbing portion. In this manner, ink mist can be removed from the atmosphere in the vicinity of the ink-jet head, making it possible to prevent the attachment of mist to unnecessary position on the recording medium or the nozzle plate.

(2) The ink-jet recording device as described in the item (1), which comprises: an irradiating portion that irradiates the recording medium with the actinic energy ray, wherein the mist adsorbing portion is disposed between the ink-jet head and the irradiating portion.

In accordance with the ink-jet recording device of the invention, the recording medium is conveyed toward the irradiating portion. Thus, the ink mist conveyed by the air flowing in the same direction can be effectively adsorbed by the mist adsorbing portion disposed downstream therefrom. In other words, the movement of ink mist accompanying the conveyance of the recording medium can be effectively utilized to enhance the adsorbability of ink mist. This action becomes more remarkable as the conveying speed of the recording medium rises.

(3) The ink-jet recording device as described in the item (1) or (2), wherein the mist adsorbing portion has one of an acute needle-like electrode and a blade-like electrode.

In accordance with the ink-jet recording device of the invention, when a voltage is applied to the mist adsorbing portion, the surface of the acute needle-like electrode or blade-like electrode emits a line of electric force radially. Thus, the electrostatic force acted on the charged ink mist rises with the movement in the adsorbing direction, making it possible to cause a high adsorbing power to act on the ink mist.

(4) The ink-jet recording device as described in the item (3), wherein the acute needle-like electrode has a curvature radius of 100 μm or less.

(5) The ink-jet recording device as described in any one of the items (1) to (4), which comprises: a mist receiving portion that is disposed opposite to the mist adsorbing portion and that receives the ink mist flied from the mist adsorbing portion by applying an electrostatic force to the mist receiving portion.

In accordance with the ink-jet recording device of the invention, a mist receiving portion is disposed opposed to the mist adsorbing portion with the ink mist adsorbed thereto. When a high voltage is applied to the mist adsorbing portion and the mist receiving portion, the resulting electrostatic force causes the ink mist to fly toward the mist receiving portion where it is then recovered in such a manner that it hits the mist receiving portion. Accordingly, the accumulation of a large amount of ink mist on the mist adsorbing portion can be prevented, making it possible to maintain good ink mist adsorbing properties always.

(6) The ink-jet recording device as described in the item (5), wherein the irradiating portion irradiates the ink mist received by the mist receiving portion with the actinic energy ray.

In accordance with the aforementioned ink-jet recording device, the ink mist which has electrostatically flied from the mist adsorbing portion and then hit the mist receiving portion is irradiated with actinic energy ray from the irradiating portion so that it is cured while being received in the mist receiving portion, making it assured that the ink mist thus attached to the ink receiving portion can be recovered without being rescattered by the subsequent ink mist or giving odor.

A shielding plate for blocking actinic energy ray emitted by the irradiating portion may be provided interposed between the mist adsorbing portion and the irradiating portion.

In accordance with the ink-jet recording device comprising this shielding plate, the ink mist which has been adsorbed by the mist adsorbing portion is not irradiated with actinic energy ray from the irradiating portion and thus can be retained by the mist adsorbing portion while being left uncured. When the ink mist is thus retained left uncured, the subsequent action of releasing ink mist to the mist receiving portion by the use of electrostatic force becomes more effective.

The ink-jet recording device of the invention comprises an ink-jet head which ejects an actinic energy ray-curable ink toward the recording medium and a mist adsorbing portion provided in the vicinity of the ink-jet head. In this arrangement, ink mist produced by the ejection of the ink can be electrostatically adsorbed and removed by the mist adsorbing portion, making it possible to prevent the attachment of ink mist to unnecessary area on the recording medium or the nozzle plate. As a result, the quality of the image thus formed and the picture drawing stability can be enhanced.

BRIEF DESCRIPTION OF THE DRAWINGS

The invention disclosed herein will be understood better with reference to the following drawings of which.

DETAILED DESCRIPTION OF THE INVENTION

Exemplary embodiments of implementation of the ink-jet recording device according to the invention will be described hereinafter in connection with the attached drawings.

Figure 1:
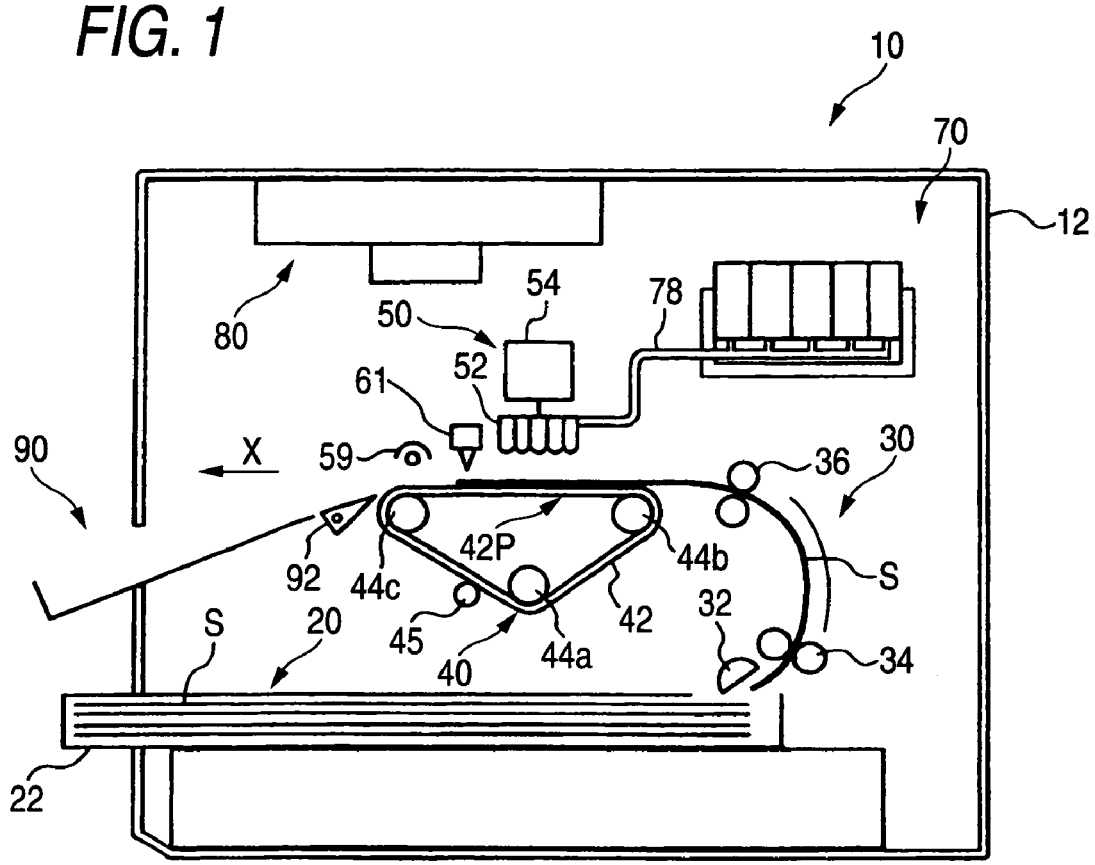
FIG. 1 is a schematic view that illustrates a configuration of an ink-jet recording device according to an embodiment of implementation of the invention.
Figure 2:
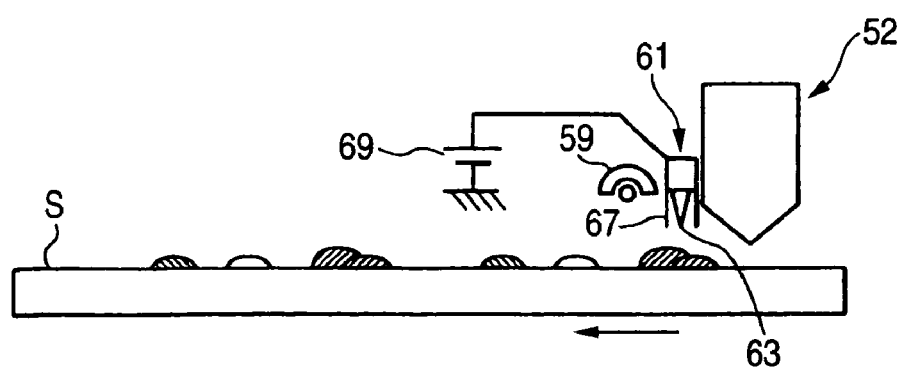
FIG. 2 is an enlarged side view that illustrates an essential part of the ink-jet recording device illustrated in FIG. 1, FIG. 3 consists of FIGS. 3A and 3B that illustrate an enlarged perspective view of essential part illustrating an example of electrode of the mist adsorbing portion illustrated in FIG. 2.

FIG. 1 is a schematic view that illustrates configuration of an ink-jet recording device according to an embodiment of implementation of the invention. FIG. 2 is an enlarged side view that illustrates an essential part of the ink-jet recording device illustrated in FIG. 1.

Figure 3A:
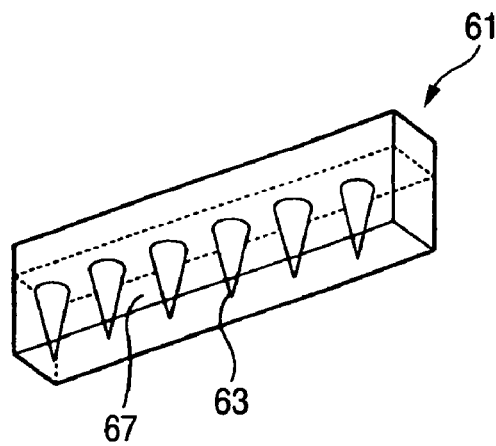
Figure 3B:
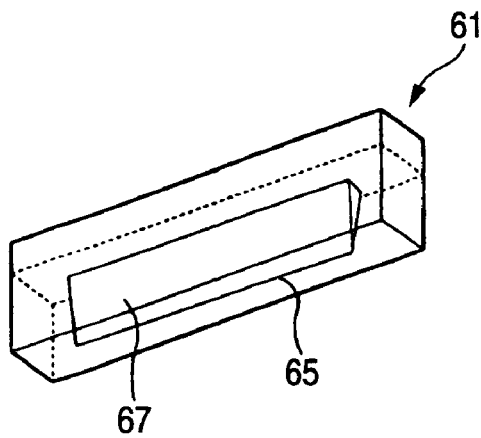
Figure 4:
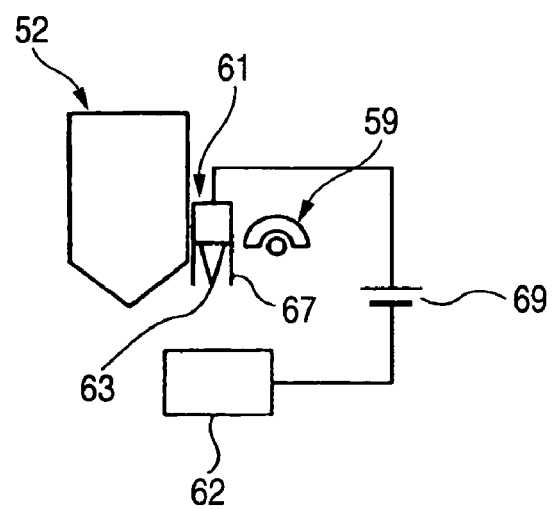
FIG. 4 is a diagrammatic view that illustrates an example of the configuration of the mist receiving portion.

FIG. 3 consists of FIGS. 3A and 3B that illustrate an enlarged perspective view of essential part illustrating an example of electrode of the mist adsorbing portion illustrated in FIG. 2. FIG. 4 is a diagrammatic view that illustrates an example of the configuration of the mist receiving portion.

In these figures, an ink-jet recording device (hereinafter also referred to as "actinic energy ray-curing ink-jet device" and "photosetting ink-jet device") 10 comprises in its housing 12 a recording medium receiving portion 20 for receiving a plurality of sheets of sheet-like recording medium S having the same size in a stack, a conveying portion 30 for retrieving the recording medium S from the receiving portion 20, a scanning conveying portion 40 for scanning the recording medium S which has been conveyed by the conveying portion 30 while being retained on the recording area, an image recording portion 50 for making ink-jet recording on the recording medium S which is being retained and moved by the scanning conveying portion 40 and irradiating the recording medium S with actinic energy ray (ultraviolet ray in the present embodiment) so that it is fixed, an ink storing portion 70 for storing the ink to be supplied into the image recording portion 50 and a tray 90 onto which the recording medium S which has been subjected to recording in the image recording portion 50 is discharged.

In the recording medium receiving portion 20, a receiving cassette 22 for receiving the recording medium S is detachably disposed under the housing 12 of the ink-jet device 10 so that recording media S having different sizes replaced by each other can be supplied into the device. The recording medium receiving portion 20 can also be arranged to have a plurality of cassettes mounted thereon. In the conveying portion 30, a feed roller 32 is provided in contact with the forward end of the recording medium S in the receiving cassette 22 set in the housing 12 in the insert direction of the receiving cassette 22. Further, a pair of conveying rollers 34, 36 for conveying the recording medium S drawn out by the feed roller 32 to the scanning/retaining portion 40 is provided.

The scanning conveying portion 40 has a conveyor belt 42 extending over three belt rollers 44a, 44b and 44c. The conveyor belt 42 is driven in the direction X from the upstream belt roller 44b toward the downstream belt roller 44c. The recording medium S is conveyed over the conveyor belt 42 between the upstream belt roller 44*b* and the downstream belt roller 44*c*.

In the image recording portion 50, an ink-jet head (hereinafter also referred to as "head unit") 52 which is an ink-jet head having a cartridge mounting portion 70 connected thereto for ink supply is provided with the forward end of the ink ejecting portion facing the conveyor belt 42 at the image recording site 40P. The head unit 52 ejects an actinic energy ray-curable ink toward the recording medium S. To the head unit 52 is connected a head driver 54 to control the ejected amount of various color inks. To the head unit 52 and the head driver 54 is connected the cartridge mounting portion 70 for ink supply. From the cartridge mounting portion 70 extends an ink supplying path 78 connected to the head unit 52.

An irradiating portion (hereinafter also referred to as "ultraviolet ray emitting portion") 59 is provided shortly after the image recording site 42P downstream from the head unit 52. The ultraviolet ray emitting portion 59 gives an actinic energy ray strong enough to cure the ink shortly after being deposited on the recording medium S. In other words, the ultraviolet ray emitting portion 59 is disposed downstream along the conveyance of the recording medium. The ultraviolet ray emitting portion 59 emits actinic energy ray to cure the ink.

A peeling nail 92 is provided downstream from the position at which the recording medium S is separated from the conveyor belt 42 (position corresponding to the downstream belt roller 44*c* in the present embodiment). The forward end of the peeling nail 92 comes in contact with the conveyor belt 42 in the vicinity of the downstream belt roller 44*c* to accelerate the peeling of the recording medium S off the conveyor belt 42. The tray 90 receives the recording medium S which has been peeled off the conveyor belt 42.

In the ultraviolet ray emitting portion 59, an exhausting/cooling portion 80 is provided at the upper portion in the housing 12 to inhibit the rise of temperature in the housing 12 due to the use of strong light for ink curing as previously mentioned.

Referring to another configuration of the aforementioned recording medium receiving portion 20, a cassette for supplying a recording medium wound on a roller may be used. In this case, a cutter for cutting the recording medium into a desired length is provided instead of the feed roller 32 of the conveying portion 30.

The cartridge mounting portion 70 has a plurality of cartridges mounted therein for storing W (white), Y (yellow), M (magenta), C (cyan) and K (black) inks, respectively. The various cartridges are connected to the head unit 52 via independently formed ink supplying paths 78, respectively, and are each detachably mounted on the cartridge mounting portion 70.

In accordance with the present embodiment, the head unit 52 is formed by a full-line head having the crosswise length of the recording medium S as array. Accordingly, the head unit 52 is fixed to and supported on the housing 12 with a bracket (not illustrated).

While the present embodiment has been described with reference to the case where the head unit 52 is a full-line head having ink-jet nozzles aligned along the width of the recording medium S, the head unit 52 may be a scanning head for vertically scanning along the conveyance of the recording medium S as described later. In this arrangement, the ultraviolet ray emitting portion is provided in such an arrangement that it moves with the scanning head. While the present embodiment has been described with reference to the case where the ink-jet recording site is conveyed over the conveyor belt, other configurations may be employed such as conveyance of the recording medium over the platen on the ink-jet recording site while being clamped between the conveying rollers.

The actinic energy ray-curing ink-jet recording device 10 according to the present embodiment comprises has a mist adsorbing portion 61 provided in the vicinity of the head unit 52. The mist adsorbing portion 61 electrostatically adsorbs ink mist produced by the ejection of the ink from the head unit 52.

The mist adsorbing portion 61 has an acute needle-like electrode 63 illustrated in FIG. 3A or a blade-like electrode 65 illustrated in FIG. 3B. The term "acute" as used herein is meant to indicate that the forward end is as fine as 100 μm or less, preferably 50 μm or less as calculated in terms of a curvature radius. The needle-like electrode 63 or blade-like electrode 65 is preferably made of a metal having such an acute edge covered by an ink-repellent material. In the case of the needle-like electrode 63, plurality needle-like electrodes are aligned in the direction perpendicular to the conveying direction X of the recording medium S (along the width of the recording medium S). The blade-like electrode 65, if used, is disposed in such an arrangement that the longitudinal direction thereof is perpendicular to the conveying direction X of the recording medium S. The present embodiment will be described with reference to the case where the needle-like electrode 63 is used by way of example.

In the mist adsorbing portion 61, a line of electric force is radially emitted from the surface of the acute needle-like electrode 63 by a voltage applied to the needle-like electrode 63. In this manner, the ink mist is polarized. The electrostatic force acting on the ink mist rises with the movement in the adsorbing direction, making it possible to cause a high adsorbing power to act on the ink mist.

The mist adsorbing portion 61 is disposed interposed between the head unit 52 and the ultraviolet ray emitting portion 59. More preferably, the mist adsorbing portion 61 is disposed downstream from the head unit 52 in the right vicinity of the head unit 52. In this arrangement, the recording medium S is conveyed toward the ultraviolet ray emitting portion 59. Thus, the ink mist conveyed by the air flowing in the same direction can be effectively adsorbed by the mist adsorbing portion 61 disposed downstream therefrom. In other words, the movement of ink mist accompanying the conveyance of the recording medium S can be effectively utilized to enhance the adsorbability of ink mist. This action becomes more remarkable as the conveying speed of the recording medium S rises.

The high voltage applied to the needle-like electrode 63 of the mist adsorbing portion 61 may be positive or negative. The voltage is preferably from 1 to 4 kV as calculated in terms of absolute value. In some detail, when such a high voltage is applied to the needle-like electrode 63, the mist is polarized and attached to the electrode. In this manner, the ink mist is removed from the atmosphere disposed in the vicinity of the head unit, making it possible to prevent the attachment of the mist to unnecessary area on the recording medium S or the nozzle plate.

A shielding plate 67 for blocking actinic energy ray emitted by the ultraviolet ray emitting portion 59 is provided interposed between the mist adsorbing portion 61 and the ultraviolet ray emitting portion 59. The shielding plate 67 prevents the needle-like electrode 63 of the mist adsorbing portion 61 from being irradiated with actinic energy ray from the ultraviolet ray emitting portion 59. In this manner, the ink mist which has been adsorbed by the mist adsorbing portion 61 is not irradiated with actinic energy ray from the ultraviolet ray emitting portion 59 and thus can be retained by the mist adsorbing portion 61 while being left uncured. When the ink mist is thus retained left uncured, the subsequent action of releasing ink mist to the mist receiving portion by the use of electrostatic force becomes more effective.

The actinic energy ray-curing ink-jet recording device 10 has a mist receiving portion 62 provided therein opposably to the mist adsorbing portion 61. The mist receiving portion 62 has an electrode provided opposed to the mist adsorbing portion 61. The mist receiving portion 62 is connected to the mist adsorbing portion 61 via a high voltage generating circuit 69. A high voltage is applied to the electrode such that a higher electric field than that developed during the recovery of mist by the needle-like electrode 63 of the mist adsorbing portion 61 can be given. When such a high voltage is applied, the ink mist which has been attached to the mist adsorbing portion 61 then flies toward and hits the mist receiving portion 62 by which it is then received and recovered. In the configuration of disposition of the mist adsorbing portion 61 and the mist receiving portion 62 opposed to each other, it is required that they don't interfere with the conveying path of the recording medium S. To this end, one of the mist adsorbing portion 61 and the mist receiving portion 62 may be movable and the other may be fixed. Alternatively, both the mist adsorbing portion 61 and the mist receiving portion 62 may be fixed or movable.

Referring to the recovery of the ink mist, the mist receiving portion 62 is disposed opposed to the mist adsorbing portion 61 having ink mist adsorbed thereto. When a high voltage is applied to the mist adsorbing portion 61 and the mist receiving portion 62 under these conditions, the resulting electrostatic force causes the ink mist to fly toward and hit the mist receiving portion 62 by which it is then received. Accordingly, when the recovering job is frequently effected, the ink mist is not accumulated on the mist adsorbing portion 61 in a large amount, making it possible to always maintain good ink mist adsorbing properties.

Further, the mist receiving portion 62 is preferably arranged such that the ink mist thus recovered is irradiated with actinic energy ray from the ultraviolet ray emitting portion 59. When thus irradiated with actinic energy ray from the ultraviolet ray emitting portion 59, the ink mist which has flied from the mist adsorbing portion 61 and hit the mist receiving portion 62 by an electrostatic force is then cured while being received by the mist receiving portion 62. In this manner, the ink mist which has been received cannot be scattered again by the impact of the ink mist that subsequently hits the mist receiving portion 62, making it assured that the ink mist can be recovered. Moreover, since the ink mist thus received is cured, the waste ink in the mist receiving portion 62 can be easily discarded, making it possible to inhibit the generation of odor.

Thus, the actinic energy ray-curing ink-jet recording device 10 comprises a head unit 52 which ejects an actinic energy ray-curable ink toward the recording medium S and a mist adsorbing portion 61 provided in the vicinity of the head unit 52. In this arrangement, ink mist produced by the ejection of the ink can be electrostatically adsorbed and removed by the mist adsorbing portion 61, making it possible to prevent the attachment of ink mist to unnecessary area on the recording medium S or the nozzle plate. As a result, the quality of the image thus formed and the picture drawing stability can be enhanced.

Figure 5:
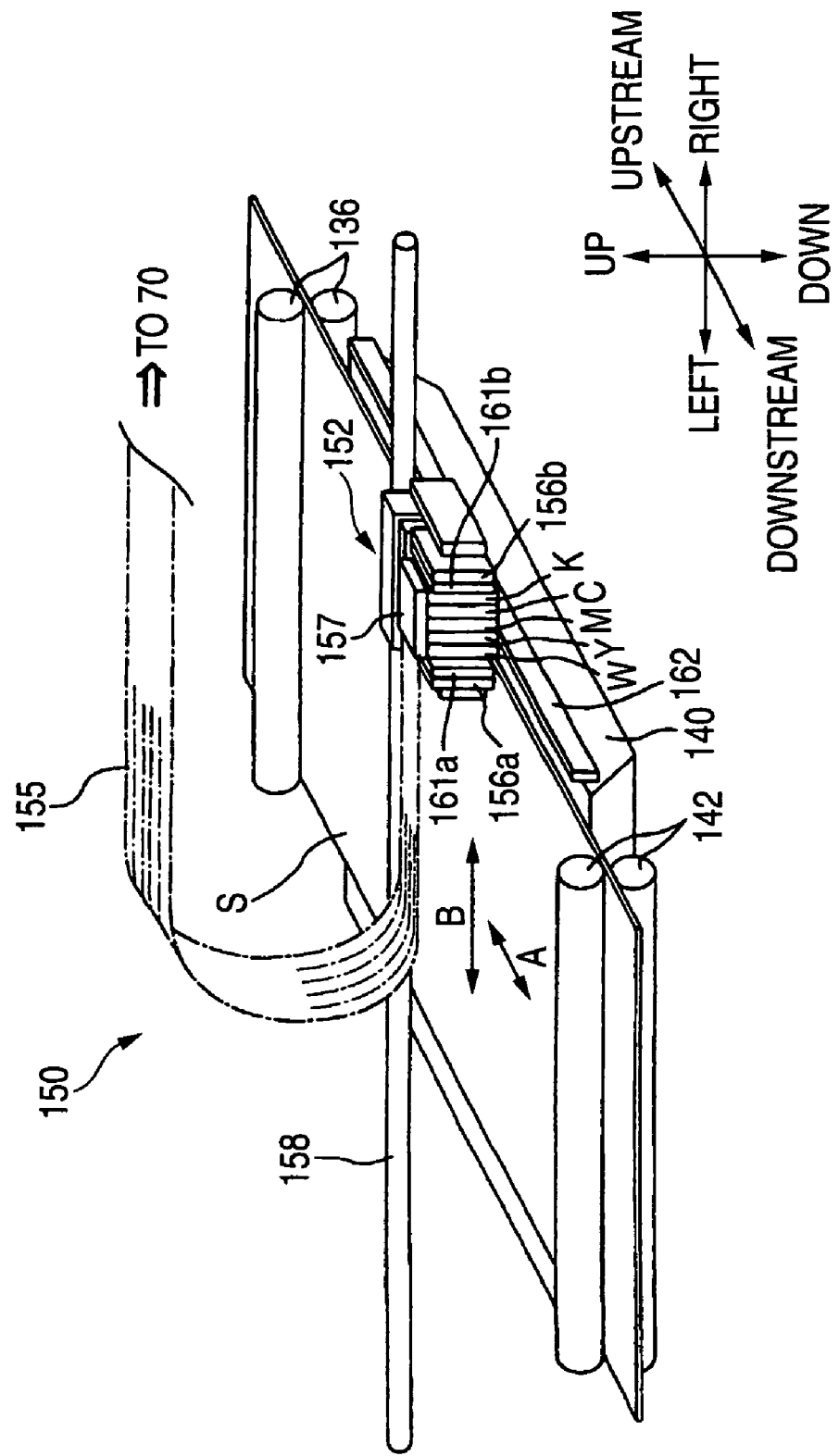
FIG. 5 is a schematic partial diagram that illustrates other configuration of the image recording portion, and FIG. 6 consists of FIGS. 6A, 6B and 6C that illustrate the configuration of a related art ink-jet head, how the ink is ejected and the ink droplet/ink mist, respectively.

FIG. 5 is a schematic partial diagram that illustrates other configuration of the image recording portion.

While the head unit 52 of the recording device 10 illustrated in FIG. 1 is an ink-jet head of line-type having ink ejection nozzles aligned along the total width of the recording medium S, the head unit 152 illustrated in FIG. 3 is an ink-jet head of a multi-channel type which scans also along the width of the recording medium S. The configuration of the image recording portion of FIG. 5 will be described hereinafter. Where the elements are the same as those of FIG. 1 in their configuration and function, the same numbers are used.

FIG. 5 depicts only an image recording portion 150 and a platen 140 for retaining the recording medium. During image recording, a pair of scanning conveying rollers 136 carry a fresh recording medium S from a recording medium tray (not illustrated) onto the planar platen 140.

Above the platen 140 is disposed the image recording portion 150 in which a head unit 152 for recording an image on the recording surface of the recording medium S is supported on and suspended from a guide member 158 extending in the direction perpendicular to the conveying direction A (scanning direction B). Mist adsorbing portions 161a, 161b and ultraviolet ray emitting portions 156a, 156b are provided in such an arrangement that they can altogether move in the direction B as the head unit 152 moves back and forth. In the present embodiment, the head unit 152 comprises five nozzle blocks which eject five color (white W, yellow Y, magenta M, cyan C, black K) actinic energy ray-curing inks toward the recording surface of the recording medium S, respectively. The ultraviolet-curable inks which have thus been ejected from the various nozzles and hit the recording medium S are irradiated with ultraviolet ray from one of the ultraviolet ray emitting portions 156a, 156b which immediately pass over the recording medium S. Thereafter, the scanning conveying roller pair 142 carries the recording medium S while catching the forward end thereof until the recording medium S is discharged out of the ink-jet recording device.

The cartridge mounting portion 70 and the head unit 152 are connected to each other via an ink supplying path 155 (illustrated connected to the cartridge mounting portion 70 by an arrow). The ink supplying path 155 is made of a flexible tube material and is connected to a connecting portion 157 provided directly above the head unit 152. In other words, the ink supplying path 155 is arranged so flexible as to cope with the movement of the head unit 152.

The mist adsorbing portions 161a, 161b are mounted with the head unit 152 interposed therebetween along the longitudinal direction of the guide member 158. Two ultraviolet ray emitting portions 156a, 156b for emitting ultraviolet ray are mounted on the outer side of the mist adsorbing portions 161a, 161b, respectively. The mist adsorbing portions 161a, 161b and the ultraviolet ray emitting portions 156a, 156b are arranged such that they can altogether move as the head unit 152 moves back and forth. When the inks are ejected from the various nozzles, the resulting ink mist is then adsorbed by the mist adsorbing portions 161a, 161b. Subsequently, the ultraviolet-curable inks which have hit the recording medium S are irradiated with ultraviolet ray from one of the ultraviolet ray emitting portions 156a, 156b which immediately pass over the recording medium S.

The mist receiving portion 162 is disposed on the platen 140 parallel to the conveying direction of the recording medium S. When the head unit 152 has finished the scanning in the scanning direction B, the mist receiving portion 162 is then disposed directly under the position at which the mist adsorbing portions 161a, 161b stop. When a high voltage is then applied to the mist receiving portion 162 as in the aforementioned case, the mist ink is recovered.

Alternatively, above the recording medium S, a corona charger may be provided at the upstream end of the platen 140 for the purpose of enhancing the adhesion between the recording medium S and the platen 140 and a destaticizer may be provided downstream along the path of carriage of the recording medium S with the forward end thereof caught by the scanning conveying roller pair 142. In this case, the platen 140 needs to be made of an electrically-conductive material.

The term "actinic energy ray" as used herein is not specifically limited so far as it is strong enough to generate starting seeds in the ink composition when emitted and widely include α ray, γ ray, X ray, ultraviolet ray and electron ray. Preferred among these active energies are ultraviolet ray and electron ray from the standpoint of curing sensitivity and device availability. Particularly preferred among these active energies are ultraviolet ray. Accordingly, as the ink composition of the invention there is preferably used an ink composition that can cure when irradiated with ultraviolet ray.

In the ink-jet recording device of the invention, the peak wavelength of actinic energy ray is, e.g., from 200 nm to 600 nm, preferably from 300 nm to 450 nm, more preferably from 350 nm to 450 nm, though depending on the absorption characteristics of the sensitizing dyes in the ink composition. Further, the electron movement type starting system (a) of the ink composition of the invention has a sufficient sensitivity even to a low output actinic energy ray. Accordingly, the output of the actinic energy ray is, e.g., 2,000 mJ/cm$^2$ or less, preferably from 10 to 2,000 mJ/cm$^2$, more preferably from 20 to 1,000 mJ/cm$^2$, even more preferably from 50 to 800 mJ/cm$^2$. The is preferably emitted at an irradiance of from 10 to 2,000 mW/cm$^2$, more preferably from 20 to 1,000 mW/cm$^2$ on the exposed surface (maximum irradiance on the surface of the recording medium).

In particular, the ink-jet recording device of the invention is preferably arranged such that the actinic energy ray is emitted by a light-emitting diode that emits ultraviolet ray having a peak emission wavelength of from 390 nm to 420 nm and a maximum irradiance of from 10 to 1,000 mW/cm$^2$ on the surface of the recording medium.

The ink-jet recording device of the invention is also preferably arranged such that the ink composition which has been ejected onto the recording medium is irradiated with the actinic energy ray for, e.g., 0.01 to 120 seconds, preferably 0.1 to 90 seconds.

Further, the ink-jet recording device of the invention is preferably arranged such that the ink composition is heated to a predetermined temperature and the period of time between the hitting of the ink composition to the recording medium and the irradiation of the ink composition with actinic energy ray is from 0.01 to 0.5 seconds, preferably from 0.01 to 0.3 seconds, more preferably from 0.01 to 0.15 seconds. By thus controlling the period of time between the hitting of the ink composition to the recording medium and the irradiation of the ink composition with actinic energy ray to an extremely small value, the ink composition which has hit the recording medium can be prevented from bleeding before being cured.

In order to obtain a color image using the ink-jet recording device of the invention, it is preferred that the color inks be superposed on each other in the ascending order of lightness from the top layer. In this arrangement, the actinic energy ray can reach even the bottom layer of color ink, making it possible to expect the provision of good curing sensitivity, the reduction of the amount of residual monomers, the elimination of odor and the enhancement of adhesion. While the emission of actinic energy ray can be effected such that all the color inks are altogether exposed, exposure is preferably effected every color ink from the standpoint of acceleration of curing.

The ink-jet head of the invention is, e.g., of piezoelectric type which can be driven to eject multi-size dots of from 1 to 100 pl, preferably from 1 to 30 pl at a resolution of from 320×320 to 4,000 to 4,000 dpi, preferably from 400×400 to 2,400×2,400 dpi. The term "dpi" as used herein is meant to indicate the number of dots per 2.54 cm.

Since the actinic energy ray-curing ink such as ink composition of the invention is preferably ejected to give an ink droplet having a predetermined temperature, the ink-jet recording device is preferably thermally insulated or heated over the region ranging from the ink supplying cartridge to the ink-jet head so that it is properly temperature-controlled. Further, the head unit to be heated is preferably thermally blocked or insulated so that the main body of the device cannot be affected by the external temperature. In order to reduce the printer boot time required for heating or reduce the loss of heat energy, it is preferred that the head unit be thermally insulated from the other sites and the heat capacity of the entire heating unit be reduced.

As the actinic energy ray sources there have been mainly used mercury vapor lamp, gas/solid lasers, etc. For the ultraviolet ray-curable ink-jet recording devices, mercury vapor lamp and metal halide lamp are widely used. Further, the replacement by GaN-based semiconductor ultraviolet ray emitting devices is industrially and environmentally very useful. Moreover, LED (UV-LED) and LD (UV-LD) are small-sized, long-lived, highly efficient and inexpensive and thus are expected to be used as radiation source for actinic energy ray-curing ink-jet recording device.

As mentioned above, as the actinic energy ray source there can be used a light-emitting diode (LED) or laser diode (LD). In particular, in the case where an ultraviolet ray source is needed, ultraviolet LED or ultraviolet LD can be used. For example, Nichia Corporation markets an ultraviolet LED that mainly emits a spectrum having a wavelength of from 365 nm to 420 nm. Referring to the case where a shorter wavelength is needed, U.S. Pat. No. 6,084,250 discloses an LED that can emit an actinic energy ray focusing on a wavelength of from 300 nm to 370 nm. Further, other ultraviolet LED's are available to emit radiations having different ultraviolet ranges. The actinic energy ray source which is particularly preferred in the invention is UV-LED, particularly having a peak wavelength of from 350 nm to 420 nm.

(Recording Medium)

The recording medium to which the ink composition of the invention can be applied is not specifically limited and may be any of paper such as ordinary non-coated paper and coated paper, various non-absorbable resin materials for use in flexible packaging and resin films formed by these non-absorbable resin materials. Examples of various plastic films include PET film, OPS film, OPP film, ONy film, PVC film, PE film, and TAC film. Other examples of plastic materials which can be used as recording medium include polycarbonate, acrylic resin, ABS, polyacetal, PVA, and rubbers. Further, metals and glass, too, can be used as recording medium.

In the case where as the ink composition of the invention there is selected a material that shrinks little during curing, the ink composition thus cured exhibits an excellent adhesion to the recording medium. Accordingly, such an ink composition is advantageous in that it can form a high precision image even on a film that is subject to curling or deformation due to heat generated during the curing shrinkage or curing reaction of ink, such as PET film, OPS film, OPP film, ONy film and PVC film, which are heat-shrinkable.

The various constituents to be incorporated in the ink composition which can be used in the invention will be sequentially described hereinafter.

(Ink Composition)

The ink composition to be used in the invention is an ink composition which can be cured when irradiated with actinic energy ray. Examples of such an ink composition include cationically polymerizable ink compositions, radically polymerizable ink compositions, and aqueous ink compositions. These compositions will be further described hereinafter.

(Cationic Polymer-Based Ink Composition)

The cationic polymer-based ink composition comprises (a) a cationically polymerizable compound and (b) a compound which generates an acid when irradiated with actinic energy ray. The cationic polymer-based ink composition may optionally further comprise (d) an organic acidic component having a pKa value of from 2 to 6, (e) a colorant, etc.

The various components constituting the cationic polymer-based compound will be sequentially described hereinafter.

((a) Cationically Polymerizable Compound)

The cationically polymerizable compound (a) to be used in the invention is not specifically limited so far as it is a compound which undergoes polymerization reaction with the acid generated by the compound (b) described later which generates an acid when irradiated with actinic energy ray to cause curing. As such a compound there may be used any of various cationically polymerizable monomers known as cationic photopolymerizable monomer. Examples of the cationically polymerizable monomers include epoxy compounds, vinylether compounds and oxetane compounds disclosed in JP-A-6-9714, JP-A-2001-31892, JP-A-2001-40068, JP-A-2001-55507, JP-A-2001-310938, JP-A-2001-310937, and JP-A-2001-220526.

Examples of the epoxy compounds include aromatic epoxides, alicyclic epoxides and aliphatic epoxides.

As the aromatic epoxide there may be used a di- or polyglycidylether produced by the reaction of a polyvalent phenol having at least one aromatic nucleus or alkylene oxide adduct thereof with epichlorohydrin. Examples of the di- or polyglycidylether include di- or polyglycidylether of bisphenol A or alkylene oxide adduct thereof, di- or polyglycidylether of hydrogenated bisphenol A or alkylene oxide adduct thereof, and novolac type epoxy resin. Examples of the alkylene oxide include ethylene oxide, and propylene oxide.

As the alicyclic epoxide there is preferably used a cyclohexene oxide- or cyclopentene oxide-containing compound obtained by epoxidizing a compound having at least one cycloalkene ring such as cyclohexene and cyclopentene ring with a proper oxidizing agent such as hydrogen peroxide and peracid.

As the aliphatic epoxide there may be used a di- or polyglycidylether of aliphatic polyvalent alcohol or alkylene oxide adduct thereof. Representative examples of the di- or polyglycidylether include diglycidylethers of alkylene glycol such as diglycidylether of ethylene glycol, diglycidylether of propylene glycol and diglycidylether of 1,6-hexanediol, polyglycidylethers of polyvalent alcohol such as di- or triglyciylether of glycerin or alkylene oxide adduct thereof, and diglycidylethers of polyalkylene glycol such as diglycidylether of polyethylene glycol or alkylene oxide adduct thereof and diglycidylether of polypropylene glycol or alkylene oxide adduct thereof. Examples of the alkylene oxide include ethylene oxide and propylene oxide.

The epoxy compound may be monofunctional or polyfunctional.

Examples of the monofunctional epoxy compound employable herein include phenylglycidylether, p-tert-butylphenyl glycidylether, butyl glycidylether, 2-ethylhexyl glycidylether, allyl glycidylether, 1,2-butylene oxide, 1,3-butadiene monoxide, 1,2-epoxy dodecane, epichlorohydrin, 1,2-epoxydecane, styrene oxide, cyclohexene oxide, 3-methacryloyloxymethyl cyclohexene oxide, 3-acryloyloxy methyl cyclohexene oxide, and 3-binyl cyclohexene oxide.

Examples of the polyfunctional epoxy compound include bisphenol A diglycidylether, bisphenol F diglycidylether, bisphenol S diglycidylether, bromated bisphenol A diglycidylether, bromated bisphenol F diglycidylether, bromated bisphenol S diglycidylether, epoxy novolac resin, hydrogenated bisphenol A diglycidylether, hydrogenated bisphenol F diglycidylether, hydrogenated bisphenol S diglycidylether, 3,4-epoxycyclohexylmethyl-3',4'-epoxycyclohexane carboxylate, 2-(3,4-epoxycyclohexyl-5,5-spiro-3,4-epoxy)cyclohexane-metha-dioxane, bis (3,4-epoxycyclohexylmethyl) adipate, vinylcyclohexene oxide, 4-vinylepoxycyclohexane, bis(3,4-epoxy-6-methylcyclohexyl)adipate, 3,4-epoxy-6-methyl cyclohexyl-3',4'-epoxy-6'-methylcyclohexane carboxylate, methylene bis(3,4-epoxycyclohexane), dicyclopentadiene epoxide, di(3,4-epoxycyclohexyl methyl)ether of ethylene glycol, ethylene bis(3,4-epoxy cyclohexanecarboxylate), dioctyl epoxy hexahydrophthalate, di-2-ethylhexyl epoxy hexahydrophthalate, 1,4-butanediol diglycidylether, 1,6-hexanediol diglycidylether, glycerin triglycidylether, trimethylolpropane triglycidylether, polyethylene glycol diglycidylether, polypropylene glycol diglycidylether, 1,1,3-tetradecadiene dioxide, limonene dioxide, 1,2,7,8-diepoxyoctane, and 1,2,5,6-diepoxycyclooctane.

Preferred among these epoxy compounds are aromatic epoxides and alicyclic epoxides because they can be cured very quickly. Particularly preferred among these epoxy compounds are alicyclic epoxides.

Examples of the vinylether compound employable herein include di- or trivinylether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether and trimethylolpropane trivinyl ether, and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexane dimethanol monovinyl ether, n-propylvinyl ether, isopropylvinyl ether, isopropenyl ether-O-propylene carbonate, dodecylvinyl ether, diethylene glycol monovinyl ether and octadecylvinyl ether.

The vinylether compound of the invention may be monofunctional or polyfunctional.

Specific examples of the monofunctional vinylether include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexyl methyl vinyl ether, 4-methylcyclohexyl methyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxy polyethylene glycol vinyl ether, tetrahydrofuryl vinyl ether, 2-hydroxyethyl vinyl ether, 2-hydroxypropyl vinyl ether, 4-hydroxybutyl vinyl ether, 4-hydroxymethyl cyclohexyl methyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxy polyethylene glycol vinyl ether.

Examples of the polyfunctional vinyl ether include vinyl ethers such as ethylene glycol divinyl ether, diethylene glycol divinyl ether, polyethylene glycol vinyl ether, propylene glycol divinyl ether, butylene glycol divinyl ether, hexanediol divinyl ether, bisphenol A alkylene oxide divinyl ether and bisphenol F alkylene oxide divinyl ether, and polyfunctional vinyl ethers such as trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythtritol hexavinyl ether, ethylene oxide-added trimethylolpropane trivinyl ether, propylene oxide-added trimethylolpropane trivinyl ether, ethylene oxide-added ditrimethylolpropane tetravinyl ether, propylene oxide-added ditrimethylol propane tetravinyl ether, ethylene oxide-added pentaerythritol tetravinyl ether, propylene oxide-added pentaerythritol tetravinyl ether, ethylene oxide-added dipentaerythritol hexavinyl ether, and propylene oxide-added dipentaerythritol hexavinyl ether.

Preferred among these vinylether compounds are di- or trivinylether compounds from the standpoint of curability, adhesion to recording medium and surface hardness of image thus formed. Particularly preferred among these vinylether compounds are divinylether compounds.

The oxetane compound of the invention is a compound having an oxetane ring. Known oxetane compounds as disclosed in JP-A-2001-220526, JP-A-2001-310937 and JP-A-2003-341217 can be arbitrarily selected.

As the compound having an oxetane ring which can be used in the ink composition of the invention there is preferably used a compound having from 1 to 4 oxetane rings. The use of such a compound makes it easy to keep the viscosity of the ink composition within a range such that the ink composition can be fairly handled and makes it possible to obtain a high adhesion between the ink composition thus cured and the recording medium.

For the details of the compound having an oxetane ring, reference can be made to the above cited JP-A-2003-341217, paragraph [0021] to [0084]. The compounds disclosed in the above cited patent can be used also in the invention to advantage.

Preferred among the oxetane compounds to be used in the invention are those having one oxetane ring from the standpoint of viscosity and adhesion of ink composition.

The ink composition of the invention may comprise these cationically polymerizable compounds incorporated therein singly or in combination of two or more thereof. From the standpoint of effectiveness in the inhibition of shrinkage during ink curing, however, at least one compound selected from the group consisting of oxetane compounds and epoxy compounds and vinylether compounds are preferably used in combination.

The content of the cationically polymerizable compound (a) in the ink composition is preferably from 10% to 95% by weight, more preferably from 30% to 90% by weight, even more preferably from 50% to 85% by weight based on the total solid content of the composition.

((b) Compound which Generates an Acid when Irradiated with Actinic Energy Ray)

The ink composition of the invention contains a compound which generates an acid when irradiated with actinic energy ray (hereinafter optionally referred to as "photoacid generator").

As the photoacid generator to be used in the invention there may be properly selected cationic photopolymerization initiator, photoradical polymerization initiator, photodiscoloring agent for dyes, photodecoloring agent, or a compound which generates when irradiated with light ray used for microresist (ultraviolet ray having a wavelength of from 200 nm to 400 nm, far ultraviolet ray, particularly preferably g-beam, h-beam, i-beam, KrF excimer laser beam), ArF excimer laser beam, electron beam, X-ray, molecular beam, ion beam or the like.

Examples of the photoacid generator include onium salts such as diazonium salt, ammonium salt, phosphonium salt, iodonium salt, sulfonium salt, selenonium salt and arsonium salt, organic halogen compounds and organic metal/organic halogen compounds which undergo decomposition and generate an acid when irradiated with actinic energy ray, photoacid generators having o-nitrobenzyl type protective group, compounds which undergo photodecomposition to sulfonic acid such as iminosulfonate, disulfone compounds, diazoketosulfone, and diazodisulfone compounds.

As the photoacid generator there is preferably used also a oxazole derivative or s-triazine derivative disclosed in JP-A-2002-122994, paragraph [0029] to [0030]. Further, onium salt compounds and sulfonate-based compounds exemplified in JP-A-2002-122994, paragraph [0037] to [0063] can be used as photoacid generator in the invention to advantage.

These photoacid generators (b) may be used singly or in combination of two or more thereof.

The content of the photoacid generator (b) in the ink composition is preferably from 0.1 to 20% by weight, more preferably from 0.5 to 10% by weight, even more preferably from 1 to 7% by weight based on the total solid content of the ink composition.

The ink composition of the invention may also comprise various additives incorporated therein in addition to the aforementioned essential components. These arbitrary components will be further described hereinafter.

((d) Organic Acidic Component Having a pKa Value of from 2 to 6)

The ink composition of the invention may comprise (d) an organic acidic component having a pKa value of from 2 to 6 (hereinafter occasionally referred simply to as "organic acidic component") incorporated therein. The organic acidic component having a pKa value of from 2 to 6 (d) corresponds qualitatively to a weakly acidic organic compound. The organic acidic component having a pKa value of more than 6 causes the drop of sensitivity when incorporated in the ink composition of the invention. The organic acidic component having a pKa value of less than 2 causes the deterioration of age stability of the ink composition. Thus, in the invention, an organic acidic component having pKa value of from 2 to 6 is preferably used.

Specific examples of the organic acidic component having a pKa value of from 2 to 6 include carboxylic acids. Examples of the carboxylic acid include $C_1$-$C_{20}$ aliphatic or aromatic monocarboxylic acids, dicarboxylic acids and tricarboxylic acids such as acetic acid, phenylacetic acid, phenoxyacetic acid, methoxypropionic acid, lactic acid, hexanoic acid, heptanoic acid, octanoic acid, palmitic acid, stearic acid, oleic acid, linoleic acid, cyclopropylcarboxylic acid, cyclobutanecarboxylic acid, cyclopentanecarboxylic acid, cyclohexanecarboxylic acid, 1-adamanthanecarboxylic acid, 1,3-adamanthane dicarboxylic acid, norbornene-2,3-dicarboxylic acid, abietic acid, trans-retinic acid, cyclohexylacetic acid, dicyclohexylacetic acid, adamanthaneacetic acid, malonic acid, monomethylester malonate, fumaric acid, maleic acid, monomethyl ester maleate, itaconic acid, crotonic acid, succinic acid, adipic acid, sebasic acid, glycolic acid, diglycolic acid, mandelic acid, tartaric acid, malic acid, alginic acid, cinnamic acid, methoxycinnamic acid, 3,5-dimethoxycinnamic acid, benzoic acid, salicylic acid, 4-hydroxybenzoic acid, gallic acid, 3-nitrobenzoic acid, 3-chlorobenzoic acid, 4-vinylbenzoic acid, t-butylbenzoic acid, 1-naphthoic acid, 1-hydroxy-2-naphtoic acid, fluorenone-2-carboxylic acid, 9-anthracene carboxylic acid, 2-anthraquinonecarboxylic acid, phthalic acid, monomethyl ester phthalate, isophthalic acid, terephthalic acid, trimellitic acid, and monomethyl ester trimellitate. However, the invention is not limited thereto.

((e) Coloring Agent)

The ink composition of the invention can form a visible image when it comprises a coloring agent incorporated therein. For example, in the case where an image region is formed on the lithographic printing plate, it is not necessarily required that a coloring agent be incorporated in the ink composition. It is also desired from the standpoint of inspectability of the lithographic printing plate thus obtained that a coloring agent be used.

The coloring agent to be used herein is not specifically limited. Any known coloring materials (pigment, dye) may be properly selected depending on the purpose. For example, in order to form an image excellent in weathering resistance, pigments are preferably used. As dyes there may be used any of water-soluble dyes and oil-soluble dyes. However, oil-soluble dyes are preferred.

(Pigment)

Pigments which are preferably used in the invention will be described hereinafter.

The pigments to be used in the invention are not specifically limited. A dispersion of any commercially available organic or inorganic pigment in a resin which cannot dissolve the pigment therein as a dispersion medium or a pigment the surface of which is grafted with a resin can be used. Alternatively, a particulate resin dyed with a dye can be used.

Examples of these pigments include those disclosed in Seishiro Ito, "Ganryo no Jiten (Dictionary of Pigments)", 2000, W. Herbst, K. Hunger, "Industrial Organic Pigments", JP-A-2002-12607, JP-A-2002-188025, JP-A-2003-26978, and JP-A-2003-342503.

Referring to specific examples of the organic pigments and inorganic pigments which can be used in the invention, examples of those which assume yellow color include monoazo pigments such as C. I. Pigment Yellow 1 (e.g., Fast Yellow G) and C. I. Pigment Yellow 74, disazo pigments such as C. I. Pigment Yellow 12 (e.g., Disazo Yellow AAA) and C. I. Pigment Yellow 17, non-benzidine-based azo pigments such as C. I. Pigment Yellow 180, azolake pigments such as C. I. Pigment Yellow 100 (e.g., Tartrazine Yellow Lake), condensed azo pigments such as C. I. Pigment Yellow 95 (e.g., condensed azo yellow GR), acidic dye lake pigments such as C. I. Pigment Yellow 115 (e.g., Quinoline Yellow Lake), basic dye lake pigments such as C. I. Pigment Yellow 18 (e.g., Thioflavin Lake), anthraquinone-based pigments such as Flavanthrone Yellow (Y-24), isoindolinone pigments such as Isoindolinone Yellow 3RLT (Y-110), quinophthalone pigments such as Quinophthalone Yellow (Y-138), Isoindoline pigments such as Isoindoline Yellow (Y-139), nitroso pigments such as C. I. Pigment Yellow 153 (e.g., Nickel Nitroso Yellow), and metal complex salt-based azomethine pigments such as C. I. Pigment Yellow 117 (e.g., copper azomethine yellow).

Examples of those which assume red or magenta color include monoazo-based pigments such as C. I. Pigment Red 3 (e.g., Toluidine Red), disazo pigments such as C. I. Pigment Red 38 (e.g., Pyrazolone Red B), azo lake pigments such as C. I. Pigment Red 53:1 (e.g., Lake Red C) and C. I. Pigment Red 57:1 (Brilliant Carmine 6B), condensed azo pigments such as C. I. Pigment Red 144 (e.g., Condensed Azo Red BR), acidic dye lake pigments such as C. I. Pigment Red 174 (e.g., Phloxine B Lake), basic dye lake pigments such as C. I. Pigment Red 81 (e.g., Rhodamine 6G' Lake), anthraquinone-based pigments such as C. I. Pigment Red 177 (e.g., Dianthraquinonyl Red), thioindigo pigments such as C. I. Pigment Red 88 (e.g., Thioindigo Bordeaux), perynone pigments such as C. I. Pigment Red 194 (e.g., Perynone Red), perylene pigments such as C. I. Pigment Red 149 (e.g., perylene Scarlet), quinacridone pigments such as C. I. Pigment Violet 19 (unsubstituted quinacridone) and C. I. Pigment Red 122 (e.g., Quinacridone Magenta), isoindolinone pigments such as C. I. Pigment Red 180 (e.g., Isoindolidone Red 2BLT) and alizarin lake pigments such as C. I. Pigment Red 83 (e.g., Madder Lake).

Examples of those which assume blue or cyan color include disazo-based pigments such as C. I. Pigment Blue 25 (e.g., Dianisidine Blue), phthalocyanine pigments such as C. I. Pigment Blue 15 (e.g., phthalocyanine blue), acidic dye lake pigments such as C. I. Pigment Blue 24 (e.g., Peacock Blue Lake), basic dye lake pigments such as C. I. Pigment Blue 1 (e.g., Victoria Pure Blue BO Lake), anthraquinone-based pigments such as C. I. Pigment Blue 60 (e.g., Indanthrone Blue), and alkali blue pigments such as C. I. Pigment Blue 18 (e.g., Alkali blue V-5:1).

Examples of those which assume green color include phthalocyanine pigments such as C. I. Pigment Green 7 (Phthalocyanine Green) and C. I. Pigment Green 36 (Phthalocyanine Green), and azo metal complex pigments such as C. I. Pigment Green 8 (Nitroso Green).

Examples of those which assume orange color include isoindoline-based pigments such as C. I. Pigment Orange 66 (Isoindoline Orange), and anthraquinone-based pigments such as C. I. Pigment Orange 51 (Dichloropyranthrone Orange).

Examples of those which assume black color include carbon black, titanium black, and aniline black.

Specific examples of the white pigments employable herein include basic lead carbonate ($2PbCO_3Pb(OH)_2$, i.e., so-called silver white), zinc oxide (ZnO, i.e., so-called zinc white), titanium oxide ($TiO_2$, i.e., so-called titanium white), and strontium titanate ($SrTiO_3$, i.e., so-called titanium strontium white).

Among these white pigments, titanium oxide exhibits a small specific gravity, a great refractive index and a high chemical and physical stability as compared with the other white pigments and thus has a great opacifying strength and coloring power as a pigment. Titanium oxide is excellent also in durability against acid, alkali and other environmental factors. Accordingly, as white pigment there is preferably used titanium oxide. It goes without saying that other white pigments (which may be other than the above exemplified white pigments) may be used as necessary.

For the dispersion of pigment, a dispersing machine such as ball mill, sand mill, attritor, roll mill, jet mill, homogenizer, paint shaker, kneader, agitator, Henschel mixer, colloid mill, ultrasonic homogenizer, pearl mill and wet jet mill may be used.

The dispersion of pigment may be effected with a dispersant added. Examples of the dispersant employable herein include hydroxyl group-containing carboxylic acid esters, salts of long-chain polyamino amide with polymer acid ester, salts of high molecular polycarboxylic acid, high molecular unsaturated acid esters, high molecular copolymers, modified polyacrylates, aliphatic polyvalent carboxylic acids, naphthalenesulfonic acid-formalin condensates, polyoxyethylene alkylphosphoric acid esters, and pigment derivatives. Alternatively, commercially available dispersants such as Solsperse Series (produced by Zeneca Inc.) are preferably used.

As a dispersing aid there may be used a synergist depending on the pigment used. These dispersants and dispersing aids are preferably added in an amount of from 1 to 50 parts by weight based on 100 parts by weight of the pigment used.

As the dispersion medium for the various components such as pigment constituting the ink composition there may be used a solvent. Alternatively, the aforementioned cationically polymerizable compound (a), which is a low molecular component, may be used free of solvent. Since the ink composition of the invention is a radiation-curing ink which is adapted to be applied to the recording medium on which it is then cured, it is preferred that no solvents be used. This is because if any solvent remains in the cured ink image, the cured ink shows a deteriorated solvent resistance or the remaining solvent causes VOC (volatile organic compound) problem. From this standpoint of view, it is preferred that as the dispersion medium there be used cationically polymerizable compound (a). Preferred among these cationically polymerizable compounds are those having the lowest viscosity from the standpoint of dispersibility or enhancement of handleability of ink composition.

The average particle diameter of the pigment is preferably from 0.02 µm to 4 µm, more preferably from 0.02 µm to 2 µm, even more preferably from 0.02 µm to 1.0 µm.

The kind of pigment, dispersant and dispersion medium to be used and the dispersion and filtration conditions are predetermined such that the average particle diameter of the pigment particles fall within the above defined desired range. By thus controlling the particle diameter, the clogging of the head nozzle can be inhibited, making it possible to maintain the desired ink storage stability, ink transparency and curing sensitivity.

(Dye)

The dye to be used in the invention is preferably oil-soluble. In some detail, the solubility of the dye of the invention in water at 25° C. (weight of dye to be dissolved in 100 g of water) is 1 g or less, preferably 0.5 g or less, more preferably 0.1 g or less. Accordingly, a so-called water-insoluble oil-soluble dye is preferably used.

Referring to the dye to be used in the invention, the aforementioned dye nucleus preferably has an oil-solubilizing group incorporated therein to cause the dye to be dissolved in the ink composition in a required amount.

Examples of the oil-solubilizing group include long-chain and branched alkyl groups, long-chain and branched alkoxy groups, long-chain and branched alkylthio groups, long-chain and branched alkylsulfonyl groups, long-chain and branched acyloxy groups, long-chain and branched alkoxycarbonyl groups, long-chain and branched acyl groups, long-chain and branched acylamino groups, long-chain and branched alkylsulfonylamino groups, long-chain and branched alkylaminosulfonyl groups, and aryl, aryloxy, aryloxycarbonyl, arylarbonyloxy, arylaminocarbonyl, arylaminosulfonyl and arylsulfonylamino groups containing these long-chain and branched substituents.

Alternatively, a water-soluble dye having a carboxylic acid or sulfonic acid may be reacted with a long-chain or branched alcohol, amine, phenol or aniline derivative to convert the carboxylic acid or sulfonic acid into alkoxycarbonyl group, aryloxycarbonyl group, alkylaminosulfonyl group or arylaminosulfonyl group as an oil-solubilizing group, thereby providing a dye of the invention.

The aforementioned oil-soluble dye preferably has a melting point of 200° C. or less, more preferably 150° C. or less, even more preferably 100° C. or less. The use of an oil-soluble dye having a low melting point makes it possible to inhibit the crystallization of the dye in the ink composition and hence improve the storage stability of the ink composition.

In order to enhance the durability against fading, particularly against oxidizing materials such as ozone, and the curing properties, the oxidation potential of the oil-soluble dye is preferably positive (high). To this end, as the oil-soluble dye to be used in the invention there is preferably used one having an oxidation potential of 1.0 V (vsSCE) or more. The oxidation potential of the oil-soluble dye is preferably as high as possible, more preferably 1.1 V (vsSCE) or more, particularly preferably 1.15 V (vsSCE) or more.

As the yellow color dye there is preferably used a compound having the structure represented by the general formula (Y-I) disclosed in JP-A-2004-250483.

Particularly preferred examples of the yellow color dye include those represented by the general formulae (Y-II) to (Y-IV) disclosed in JP-A-2004-250483, paragraph [0034]. Specific examples of these dyes include compounds disclosed in JP-A-2004-250483, paragraph [0060] to [0071]. The oil-soluble dye of the general formula (Y-I) disclosed in these patents may be used not only for yellow ink but also any other color inks such as black ink and red ink.

As the magenta color dye there is preferably used a compound having the structure represented by the general formula (3) or (4) disclosed in JP-A-2002-114930. Specific examples of such a compound include those disclosed in JP-A-2002-114930, paragraph [0054] to [0073].

Particularly preferred examples of the magenta dye include azo dyes represented by the general formulae (M-1) and (M-2) disclosed in JP-A-2002-121414, paragraph [0084] to [0122]. Specific examples of the azo dye include compounds disclosed in JP-A-2002-121414, paragraph [0123] to [0132]. The oil-soluble dyes of the general formulae (3), (4), (M-1) and (M-2) disclosed in these patents may be used not only for magenta color dye but also for any other color inks such as black ink and red ink.

Preferred examples of the cyan color dye include dyes represented by the general formulae (I) to (IV) disclosed in JP-A-2001-181547, and dyes represented by the general formulae (IV-1) to (IV-4) disclosed in JP-A-2002-121414, paragraph [0063] to [0078]. Specific examples of these dyes include compounds disclosed in JP-A-2001-181547, paragraph [0052] to [0066] and JP-A-2002-121414, paragraph [0079] to [0081].

Particularly preferred examples of the cyan dye include phthalocyanine dyes represented by the general formulae (C-I) and (C-II) disclosed in JP-A-2002-121414, paragraph [0133] to [0196], even more preferably (C-II). Specific examples of these phthalocyanine dyes include compounds disclosed in JP-A-2002-121414, paragraph [0198] to [0201]. The oil-soluble dyes of the general formulae (I) to (IV), (IV-1) to (IV-4), (C-I) and (C-II) may be used not only for cyan color ink but also for any other color inks such as black ink and green ink.

These coloring agents are preferably incorporated in the ink composition in an amount of from 1 to 20% by weight, more preferably from 2 to 10% by weight as calculated in terms of solid content.

(Other Components)

Various additives which are used as necessary will be described hereinafter.

(Ultraviolet Absorber)

In the invention, an ultraviolet absorber may be used from the standpoint of enhancement of weathering resistance of the image obtained and prevention of fading of the image.

Examples of the ultraviolet absorber employable herein include benzotriazole-based compounds disclosed in JP-A-58-185677, JP-A-61-190537, JP-A-2-782, JP-A-5-197075 and JP-A-9-34057, benzophenone-based compounds disclosed in JP-A-46-2784, JP-A-5-194483 and U.S. Pat. No. 3,214,463, cinnamic acid-based compounds disclosed in JP-B-48-30492, JP-A-56-21141 and JP-A-10-88106, triazine-based compounds disclosed in JP-A-4-298503, JP-A-8-53427, JP-A-8-239368, JP-A-10-182621 and JP-T-8-501291, and compounds which absorb ultraviolet ray to emit fluorescence, so-called fluorescent brighter, such as stilbene-based and benzoxazole-based compounds disclosed in Research Disclosure No. 24239.

The added amount of the ultraviolet absorber is properly predetermined depending on the purpose but is normally from about 0.5 to 15% by weight as calculated in terms of solid content.

(Sensitizer)

The ink composition of the invention may comprise a sensitizer incorporated therein as necessary for the purpose of enhancing the acid generation efficiency of photoacid generator and moving the wavelength of sensitivity to a longer range. As such a sensitizer there may be used any material which can sensitize the photoacid generator by an electron moving mechanism or energy moving mechanism. Preferred examples of the sensitizer include aromatic polycondensed cyclic compounds such as anthracene, 9,10-dialkoxyanthracene, pyrene and perylene, aromatic ketone compounds such as acetophenone, benzophenone, thioxanthone and Michler's ketone, and heterocyclic compounds such as phenothiazine and N-aryloxazolidinone. The added amount of the sensitizer is properly predetermined depending on the purpose but is normally from 0.01 to 1 mol-%, preferably from 0.1 to 0.5 mol-% based on the photoacid generator.

(Oxidation Inhibitor)

The ink composition of the invention may comprise an oxidation inhibitor incorporated therein to enhance stability thereof. Examples of the oxidation inhibitor employable herein include those disclosed in European Disclosed Patent Nos. 223739, 309401, 309402, 310551, 310552 and 459416, German Disclosed Patent No. 3435443, JP-A-54-48535, JP-A-62-262047, JP-A-63-113536, JP-A-63-163351, JP-A-2-262654, JP-A-2-71262, JP-A-3-121449, JP-A-5-61166, JP-A-5-119449, U.S. Pat. Nos. 4,814,262 and 4,980,275.

The added amount of the oxidation inhibitor is properly predetermined depending on the purpose but is normally from about 0.1 to 8% by weight as calculated in terms of solid content.

(Fading Inhibitor)

The ink composition of the invention may comprise various organic or metal complex-based fading inhibitors incorporated therein. Examples of the organic fading inhibitor employable herein include hydroquinones, alkoxyphenols, dialkoxyphenols, phenols, anilines, amines, indanes, chromanes, alkoxyanilines, and heterocycles. Examples of the metal complex-based fading inhibitor employable herein include nickel complexes, and zinc complexes. In some detail, compounds disclosed in patents cited in Research Disclosure No. 17643, VII-I to J, Research Disclosure No. 15162, Research Disclosure No. 18716, left column on page 650, Research Disclosure No. 36544, page 527, Research Disclosure No. 307105, page 872, and Research Disclosure No. 15162 and compounds contained in the general formulae and examples of representative compounds disclosed in JP-A-62-215272, pp. 127 to 137 can be used.

The added amount of the fading inhibitor is properly predetermined depending on the purpose but is normally from about 0.1 to 8% by weight as calculated in terms of solid content.

(Electrically-Conductive Salts)

The ink composition of the invention may comprise an electrically-conductive salt such as potassium thiocyanate, lithium nitrate, ammonium thiocyanate and dimethylamine hydrochloride incorporated therein for the purpose of controlling the ejectability thereof.

(Solvent)

The ink composition of the invention may also comprise an extremely slight amount of an organic solvent incorporated therein to improve the adhesion thereof to the recording medium to advantage.

Examples of the solvent employable herein include ketone-based solvents such as acetone, methyl ethyl ketone and diethyl ketone, alcohol-based solvents such as methanol, ethanol, 2-propanol, 1-propanol, 1-butanol and tert-butanol, chlorine-based solvents such as chloroform and methylene chloride, aromatic solvents such as benzene and toluene, ester-based solvents such as ethyl acetate, butyl acetate and isopropyl acetate, ether-based solvents such as diethyl ether, tetrahydrofurane and dioxane, and glycol ether-based solvents such as ethylene glycol monomethyl ether and ethylene glycol dimethyl ether.

In this case, the organic solvent is added in such an amount that no problems of solvent resistance and VOC can occur to advantage. The added amount of the solvent is preferably from 0.1 to 5% by weight, more preferably from 0.1 to 3% by weight based on the total amount of the ink composition.

(Polymer Compound)

The ink composition of the invention may comprise various polymer compounds incorporated therein to adjust the physical properties of the film. Examples of the polymer compound employable herein include acrylic polymers, polyvinyl butyral resins, polyurethane resins, polyamide resins, polyester resins, epoxy resins, phenol resins, polycarbonate resins, polyvinyl formal resins, shellac, vinyl-based resins, acrylic resins, rubber-based resins, waxes, and other natural resins. Two or more of these polymer compounds may be used in combination. Preferred among these polymer compounds are vinyl-based copolymers obtained by the copolymerization of acrylic monomers. Further, as the copolymer composition of polymer binder there is preferably used a copolymer containing a "carboxyl group-containing monomer", "methacrylic acid alkyl ester" or "acrylic acid alkyl ester" as a structural unit.

(Surface Active Agent)

The ink composition of the invention may comprise a surface active agent incorporated therein.

As the surface active agent there may be used any of those disclosed in JP-A-62-173463 and JP-A-62-183457. Examples of the surface active agent employable herein include anionic surface active agents such as dialkylsulfosuccinic acid salts, alkylnaphthalenesulfonic acid salts and aliphatic acid salts, nonionic surface active agents such as polyoxyethylene alkyl ether, polyoxyethylene alkyl aryl ether, acetylene glycol and polyoxyethylene-polyoxypropylene block copolymer, and cationic surface active agents such as alkylamine and quaternary ammonium salt. An organic fluoro compound may be used instead of the aforementioned surface active agent. The organic fluoro compound is preferably hydrophobic. Examples of the organic fluoro compound include fluorine-based surface active agents, oil-like fluorine-based compounds (e.g., fluorinated oil), and solid fluorine compound resins (e.g., ethylene tetrafluoride resin). Specific examples of these organic fluoro compounds include those disclosed in JP-B-57-9053 (columns 8 to 17) and JP-A-62-135826.

Besides these additives, a leveling agent, a matting agent, a wax for adjusting the physical properties of the film, a tackifier which doesn't inhibit polymerization to improve adhesion to recording medium such as polyolefin and PET, etc. may be incorporated in the ink composition.

Specific examples of the tackifier employable herein include high molecular tacky polymers disclosed in JP-A-2001-49200, pp. 5 to 6 (e.g., copolymer comprising ester of (meth) acrylic acid with alcohol having a $C_1$-$C_{20}$ alkyl group, ester of (meth)acrylic acid with $C_3$-$C_{14}$ alicyclic alcohol or ester of (meth) acrylic acid with $C_6$-$C_{14}$ aromatic alcohol), and low molecular tackifying resins having polymerizable unsaturated bond.

(Desirable Physical Properties of Ink Composition)

The ink composition of the invention preferably has a viscosity of from 7 to 30 mPa·s, more preferably from 7 to 20 mPa·s at the ejection temperature taking into account the ejectability. The composition ratio of the ink composition is preferably adjusted and predetermined such that the viscosity thereof falls within the above defined range. The viscosity of the ink composition at a temperature of from 25° C. to 30° C. is from 35 to 500 mPa·s, preferably from 35 to 200 mPa·s. When the viscosity of the ink composition at room temperature is predetermined to be a high value, the penetration of the ink into the recording medium, even if it is porous, can be prevented, making it possible to reduce the amount of monomers left uncured and eliminate odor. Further, dot bleeding during the impact of ink droplet can be prevented, resulting in the improvement of image quality. When the ink viscosity at a temperature of from 25° C. to 30° C. is less than 35 mPa·s, the resulting effect of preventing bleeding is small. On the contrary, when the ink viscosity at a temperature of from 25° C. to 30° C. is greater than 500 mPa·s, the resulting ink solution can be difficulty delivered.

The ink composition of the invention preferably has a surface tension of from 20 to 30 mN/m, more preferably from 23 to 28 mN/m. In the case where recording is made on various recording media such as polyolefin, PET, coated paper and non-coated paper, the surface tension of the ink composition of the invention is preferably 20 mN/m or more from the standpoint of bleeding and penetration or preferably 30 mN/m or less from the standpoint of wetting properties.

The ink composition of the invention thus prepared can be used as an ink for ink-jet recording. In the case where the ink composition of the invention is used as an ink for ink-jet recording, the ink composition is ejected onto the recording medium using an ink-jet printer. Thereafter, the ink composition thus dropped on the recording medium is irradiated with actinic energy rayo that it is cured to effect recording.

In the printed matter obtained from this ink, the image area is a result of curing of the ink composition by irradiation with actinic energy ray such as ultraviolet ray and thus is excellent in strength. Thus, the ink composition of the invention can be used for various purposes such as formation of ink receiving layer (image area) besides the formation of an image with an ink.

(Radical Polymer-Based Ink Composition)

The radical polymer-based ink composition comprises a radical-polymerizable compound and a polymerization initiator. The radical polymer-based ink composition may further comprise a sensitizing dye, a coloring material, etc. as necessary.

The various components constituting the radical polymer-based ink composition will be sequentially described hereinafter.

(Radical-Polymerizable Compound)

Examples of the radical-polymerizable compound include the following compounds having addition-polymerizable ethylenically unsaturated bond.

(Compound Having Addition-Polymerizable Ethylenically Unsaturated Bond)

Examples of the compounds having addition-polymerizable ethylenically unsaturated bond which can be incorporated in the ink composition of the invention include esters of unsaturated carboxylic acid (e.g., acrylic acid, methacrylic acid, itaconic acid, crotonic acid, isocrotonic acid, maleic acid) with aliphatic polyvalent alcohol compound, and amides of the aforementioned unsaturated carboxylic acid with aliphatic polyvalent amine compound.

Referring to specific examples of the esters of aliphatic polyvalent alcohol with unsaturated carboxylic acid, examples of acrylic acid ester include ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxy propyl)ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxy ethyl)isocyanurate, and polyester acrylate oligomer.

Examples of methacrylic acid ester include tetramethylene dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, dipentaerythritol dimethacrylate, dipentaerythritol hexamethacrylate, sorbitol trimethacrylate, sorbitol tetramethacrylate, bis[p-(3-methacryloxy-2-hydroxypropoxy)phenyl]dimethylmethane, and bis-[p-(acryloxyethoxy)phenyl] dimethylmethane. Examples of itaconic acid ester include ethylene glycol diitaconate, propylene glycol diitaconate, 1,3-butanediol diitaconate, 1,4-butane diol diitaconate, tetramethylene glycol diitaconate, pentaerythritol diitaconate, and sorbitol tetraitaconate.

Examples of crotonic acid ester include ethylene glycol dicrotonate, tetramethylene glycol dicrotonate, pentaerythritol dicrotonate, and sorbitol tetradicrotonate. Examples of isocrotonic acid ester include ethylene glycol diisocrotonate, pentaerythritol diisocrotonate, and sorbitol tetraisocrotonate. Examples of maleic acid ester include ethylene glycol dimaleate, triethylene glycol dimaleate, pentaerythritol dimaleate, and sorbitol tetramaleate. Mixtures of the aforementioned ester monomers may be also used. Specific examples of the monomers of amide of aliphatic polyvalent amine compound with unsaturated carboxylic acid include methylenebis-acrylamide, methylenebis-methacrylamide, 1,6-hexamethylenebis-acrylamide, 1,6-hexamethylenebis-methacrylamide, diethylenetriamine trisacrylamide, xylylene bisacrylamide, and xylylenebismethacrylamide.

Other examples of monomers include vinylurethane compounds having two or more polymerizable vinyl groups incorporated therein per molecule obtained by adding a vinyl monomer containing a hydroxyl group represented by the general formula (A): $CH_2$=C(R)COOCH$_2$CH(R')OH (in which R and R' each represent H or $CH_3$) to a polyisocyanate compound having two or more isocyanate groups per molecule as disclosed in JP-B-48-41708.

Further examples of monomers include polyfunctional acrylates and methacrylates such as urethane acrylate as disclosed in JP-A-51-37193, polyester acrylate as disclosed in JP-A-48-64183, JP-B-49-43191 and JP-B-52-30490 and epoxy acrylates obtained by the reaction of epoxy resin with (meth) acrylic acid. Moreover, those disclosed as photosetting monomer and oligomer in "The Journal of the Adhesion Society of Japan", vol. 20, No. 7, pp 300 to 308, 1984 may be used. In the invention, these monomers may be used in a chemical form such as prepolymer, i.e., dimer, trimer, oligomer, mixture and copolymer thereof.

The amount of the radically-polymerizable compound to be used is normally from 1% to 99.99%, preferably from 5% to 90.0%, more preferably from 10% to 70% based on the total amount of the components of the ink composition (The term "%" as used herein is % by weight).

(Photopolymerization Initiator)

The photopolymerization initiator to be used in the radical polymer-based ink composition of the invention will be further described hereinafter.

The photopolymerization initiator of the invention is a compound which undergoes action by light or mutual interaction with electron excitation of sensitizing dye to cause chemical change resulting in the generation of at least one of radical, acid and base.

Preferred examples of the photopolymerization initiator (a) aromatic ketones, (b) aromatic onium salt compounds, (c) organic peroxides, (d) hexaacryl biimidazole compounds, (e) ketoxime ester compounds, (f) borate compounds, (g) adinium compounds, (h) metalocene compounds, (i) active ester compounds, and (j) compounds having carbon-halogen bond.

(Sensitizing Dye)

The ink composition of the invention may also comprise a sensitizing dye incorporated therein for the purpose of enhancing the sensitivity of the photopolymerization initiator. Preferred examples of the sensitizing dye employable herein include those belonging to the following compound group having an absorption wavelength of from 350 nm to 450 nm.

Polynucleus aromatic compounds (e.g., pyrene, perylene, triphenylene), xanthenes (e.g., fluorescein, eosine, erythrosine, rhodamine B, rose bengal), cyanines (e.g., thiazarbocyanine, oxacarbocyanine), melocyanines (e.g., melocyanine, carbomelocyanine), thiazines (e.g., thionine, methylene blue, tolidine blue), acridines (e.g., acridine orange, chlroflavin, acryflavin), anthraquinones (e.g., anthraquinone), squariliums (e.g., squarilium), and coumarines (e.g., 7-diethylamino-4-methylcoumarine).

(Cosensitizer)

The ink of the invention may further comprise as a cosensitizer a known compound which acts to further enhance sensitivity or suppress the inhibition of polymerization by enzyme.

Examples of such a cosensitizer include amines such as compounds disclosed in M. R. Sander et al, "Journal of Polymer Society", vol. 10, page 3,173, 1972, JP-B-44-20189, JP-A-51-82102, JP-A-52-134692, JP-A-59-138205, JP-A-60-84305, JP-A-62-18537, JP-A-64-33104 and Research Disclosure No. 33825. Specific examples of these compounds include triethanolamine, p-dimethyl aminobenzoic acid ethyl ester, p-formyldimethylaniline, and p-methylthiodimethylaniline.

Other examples of cosensitizer include thiols and sulfides such as thiol compounds disclosed in JP-A-53-702 and JP-A-5-142772 and disulfide compounds disclosed in JP-A-56-75643. Specific examples of these compounds include 2-mercaptobenzothiazole, 2-mercaptobenzooxaole, 2-mercaptobenzoimidazole, 2-mercapto-4(3H)-oxazoline, and β-mercaptonaphthalene.

Further examples of cosensitizer include amino acid compounds (e.g., N-phenylglycine), organic metal compounds (e.g., tributyltin acetate) disclosed in JP-B-48-42965, hydrogen-providing materials disclosed in JP-B-55-34414, sulfur compounds (e.g., trithiane) disclosed in JP-A-6-308727, phosphorus compounds (e.g., diethyl phosphite) disclosed in JP-A-6-250387, and Si—H and Ge—H compounds disclosed in Japanese Patent Application No. 6-191605.

From the standpoint of enhancement of preservability, a polymerization inhibitor is preferably incorporated in an amount of from 200 ppm to 20,000 ppm. The ink for ink-jet recording of the invention is preferably heated to a temperature of from 40° C. to 80° C. to have a lower viscosity before being ejected. Also for the purpose of preventing clogging of the ink head by heat polymerization, a polymerization inhibitor is preferably added. Examples of the polymerization inhibitor include hydroquinone, benzoquinone, p-methoxyphenol, TEMPO, TEMPOL, and Cupferron A1.

(Others)

Besides these additives, known compounds may be used as necessary. For example, a surface active agent, a leveling agent, a matting agent, a polyester-based resin for adjusting physical properties of film, a polyurethane-based resin, a vinyl-based resin, an arylic acid, a rubber-based resin, and a wax may be properly selected. Further, in order to enhance the adhesion of the ink composition to the recording medium such as polyolefin and PET, a tackifier which doesn't inhibit polymerization is preferably incorporated in the ink composition. Specific examples of the tackifier include high molecular tacky polymers disclosed in JP-A-2001-49200, pp. 5-6 (e.g., copolymer comprising ester of (meth)acrylic acid with alcohol having a $C_1$-$C_{20}$ alkyl group, ester of (meth)acrylic acid with $C_3$-$C_{14}$ alicyclic alcohol or ester of (meth)acrylic acid with $C_6$-$C_{14}$ aromatic alcohol), and low molecular tackifying resins having polymerizable unsaturated bond.

The ink composition of the invention may also comprise an extremely slight amount of an organic solvent incorporated therein to improve the adhesion thereof to the recording medium to advantage. In this case, the organic solvent is added in such an amount that no problems of solvent resistance and VOC can occur to advantage. The added amount of the solvent is preferably from 0.1 to 5% by weight, more preferably from 0.1 to 3% by weight based on the total amount of the ink composition.

In order to prevent the drop of sensitivity due to the effect of the ink coloring material of blocking light, a cationically polymerizable monomer having a long life with polymerization initiator and a polymerization initiator are preferably combined to form a radical cation-containing hybrid type curable ink.

(Aqueous Ink Composition)

The aqueous ink composition comprises a polymerizable compound and a water-soluble photopolymerization initiator which undergoes action by actinic energy ray to produce radicals. If necessary, the aqueous ink composition may further comprise a coloring material, etc.

(Polymerizable Compound)

As the polymerizable compound to be incorporated in the aqueous ink composition there may be used a polymerizable compound to be incorporated in known aqueous ink compositions.

The aqueous ink composition may comprise a reactive material incorporated therein to provide a formulation optimized taking into account end user properties such as curing rate, adhesion and flexibility. Examples of the reactive material employable herein include (meth)acrylate (i.e., acrylate and/or methacrylate) monomers and oligomers, epoxides, and oxetanes.

Examples of the acrylate monomers include phenoxyethyl acrylate, octyldecyl acrylate, tetrahydrofuryl acrylate, isobornyl acrylate, hexanediol diacrylate, trimethylolpropane triacrylate, pentaerythritol triacrylate, polyethylene glycol diacrylate (e.g., tetraethylene glycol diacrylate), dipropylene glycol diacrylate, tri(propyleneglycol) triacrylate, neopentyl glycol diacrylate, bis(pentaerythritol)hexaacrylate, acrylate of ethoxylated or propoxylated glycol (e.g., propoxylated neopentyl glycol diacrylate, ethoxylated trimethylolpropane triacrylate), and mixtures thereof.

Examples of the acrylate oligomers include ethoxylated polyethylene glycol, ethoxylated trimethylol propane acrylate, polyether acrylate, ethoxylation product thereof, and urethane acrylate oligomers.

Examples of the methacrylates include hexanediol dimethacrylate, trimethylol propane trimethacrylate, triethylene glycol dimethacrylate, diethylene glycol dimethacrylate, ethylene glycol dimethacrylate, 1,4-butanediol dimethacrylate, and mixtures thereof.

The added amount of oligomer is preferably from 1% to 80% by weight, more preferably from 1% to 10% by weight based on the total amount of the ink composition.

(Water-Soluble Photopolymerization Initiator which Undergoes Action by Actinic Energy Ray to Produce Radicals)

The polymerization initiator which can be used in the ink composition of the invention will be described below. An example of the polymerization initiator is a photopolymerization initiator which acts up to a wavelength of about 400 nm. Examples of such a photopolymerization initiator include photopolymerization initiators represented by the following general formulae (hereinafter referred to as "TX Series") which exhibit functionality in a long wavelength range, that is, which is sensitive to ultraviolet ray to produce radicals. In the invention, it is particularly preferred that the photopolymerization initiator be properly selected from these examples.

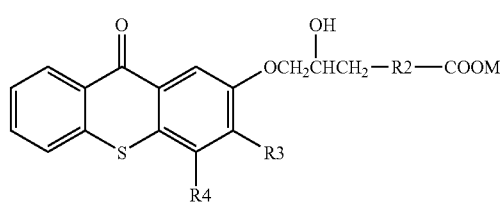

TX-1

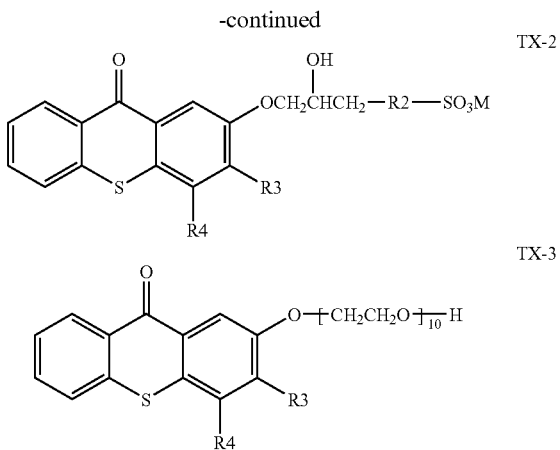

In the general formulae TX-1 to TX-3, R2 represents —(CH$_2$)x- (in which x is 0 or 1), —O—(CH$_2$)$_y$— (in which y is 1 or 2) or substituted or unsubstituted phenylene group. In the case where R2 is a phenylene group, at least one of the hydrogen atoms in the benzene ring may be substituted by one or more groups or atoms selected from the group consisting of carboxyl groups or salts thereof, sulfonic acids or salts thereof, C$_1$-C$_4$ straight-chain or branched alkyl groups, halogen atoms (e.g., fluorine, chlorine, bromine), C$_1$-C$_4$ alkoxyl groups and aryloxy groups such as phenoxy group. M represents a hydrogen atom or an alkaline metal (e.g., Li, Na, K). R3 and R4 each independently represent a hydrogen atom or a substituted or unsubstituted alkyl group. Examples of the alkyl group include straight-chain or branched alkyl groups having from about 1 to 10 carbon atoms, particularly preferably from 1 to 3 carbon atoms. Examples of substituents on these alkyl groups include halogen atoms (e.g., fluorine, chlorine, bromine), hydroxyl groups, and alkoxyl groups (having from about 1 to 3 carbon atoms). The suffix m represents an integer of from 1 to 10.

In the invention, a water-soluble derivative of the photopolymerization initiator Irgacure 2959 (Trade name; produced by Ciba Specialty Chemicals Co., Ltd.) represented by the following general formulae (hereinafter abbreviated as "IC Series") may be used. In some detail, IC-1 to IC-3 represented by the following general formulae may be used.

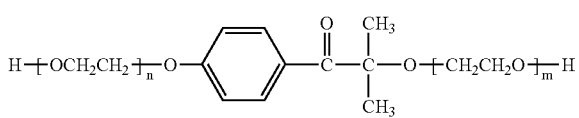

(n = 2 ~ 5, m = 0 ~ 5)

IC-1

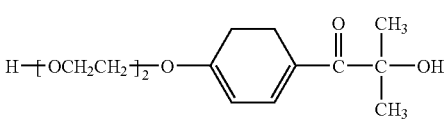

IC-2

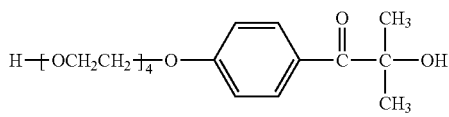

IC-3

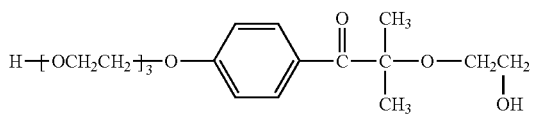

(Formulation for Clear Ink)

The aforementioned water-soluble polymerizable compound may be in the form of a transparent aqueous ink free of the aforementioned coloring materials to form a clear ink. In particular, by preparing such that ink-jet recording properties can be exhibited, an aqueous photosetting clear ink for ink-jet recording can be obtained. The use of such an ink makes it possible to obtain a clear film because it is free of coloring materials. Referring to the usage of clear ink free of coloring materials, the clear ink can be used as undercoat for providing the recording medium with adaptability to image printing or as overcoat for surface-protecting, further modifying or giving gloss to image formed by ordinary ink. The clear ink may comprise a colorless pigment or particulate material incorporated therein which is not intended for coloring. The incorporation of these pigments or particulate materials makes it possible to enhance properties such as image quality, fastness and workability (handleability) of printed matter regardless of whichever it is for undercoat or overcoat.

Referring to the formulation of such a clear ink, the ink composition is preferably prepared under the conditions such that the water-soluble polymerizable compound, which is a main component of the ink, is incorporated in an amount of from 10% to 85% and the photopolymerization initiator (e.g., ultraviolet polymerization catalyst) is incorporated in an amount of from 1 to 10 parts by weight based on 100 parts by weight of the water-soluble polymerizable compound and at least 0.5 parts by weight based on 100 parts of the ink.

(Materials Constituting Coloring Material-Containing Ink)

In the case where the aforementioned water-soluble polymerizable compound is used in the ink containing coloring materials, it is preferred that the concentration of the polymerization initiator and the polymerizable materials in the ink be adjusted according to the absorption characteristics of the coloring materials incorporated in the ink. As previously mentioned, the mixing proportion of water or solvent is from 40% to 90% by weight, preferably from 60% to 75% by weight. Further, the content of the polymerizable compound in the ink is from 1% to 30% by weight, preferably from 5% to 20% by weight based on the total amount of the ink composition. Though depending on the content of the polymerizable compound, the mixing proportion of the polymerization initiator is generally from 0.1% to 7% by weight, preferably from 0.3% to 5% by weight based on the total amount of the ink composition.

In the case where as the ink coloring materials there are used pigments, the concentration of pure pigments in the ink composition is generally from 0.3% to 10% by weight based on the total amount of the ink composition. The coloring force of the pigments depends on the dispersion of pigment particles. When the concentration of the pigments falls within a range of from about 0.3% to 1%, the resulting ink can be used as a light color ink. When the concentration of the pigments exceeds the above range, the resulting ink has a pigment concentration for ordinary coloring.

The present application claims foreign priority based on Japanese Patent Application (JP 2005-240927) filed Aug. 23 of 2005, the contents of which is incorporated herein by reference.

What is claimed is:

1. An ink-jet recording device comprising:
   an ink-jet head that ejects an ink droplet toward a recording medium, the ink droplet curable by irradiating with an actinic energy ray to form an image on the recording medium; and
   a mist adsorbing portion that is disposed in the vicinity of the ink-jet head and that electrostatically adsorbs an ink mist that is produced when the ink droplet is ejected from the ink-jet head, and is attached to an area different from an area of the image on the recording medium if not adsorbed by the mist adsorbing portion,
   wherein the mist adsorbing portion has one of an acute needle-like electrode and a blade-like electrode, and
   wherein the acute needle-like electrode has a curvature radius of 100 μm or less.

2. The ink-jet recording device as claimed in claim 1, wherein the mist adsorbing portion is disposed downstream along a conveyance direction of the recording medium with respect to the ink-jet head.

3. The ink-jet recording device as claimed in claim 1, wherein the ink mist is produced substantially simultaneously with the ejecting of the ink droplet.

4. An ink-jet recording device comprising:
   an ink-jet head that ejects an ink droplet toward a recording medium, the ink droplet curable by irradiating with an actinic energy ray to form an image on the recording medium;
   a mist adsorbing portion that is disposed in the vicinity of the ink-jet head and that electrostatically adsorbs an ink mist that is produced when the ink droplet is ejected from the ink-jet head, and is attached to an area different from an area of the image on the recording medium if not adsorbed by the mist adsorbing portion; and
   a mist receiving portion that is disposed opposite to the mist adsorbing portion and that receives the ink mist flied from the mist adsorbing portion by applying an electrostatic force to the mist receiving portion.

5. The ink-jet recording device as claimed in claim 4, wherein the irradiating portion irradiates the ink mist received by the mist receiving portion with the actinic energy ray.

6. The ink-jet recording device as claimed in claim 4, wherein the mist adsorbing portion has one of an acute needle-like electrode and a blade-like electrode.

7. The ink-jet recording device as claimed in claim 4, wherein the mist adsorbing portion is disposed downstream along a conveyance direction of the recording medium with respect to the ink-jet head.

8. An ink-jet recording device comprising:
   an ink-jet head that ejects an ink droplet toward a recording medium, the ink droplet curable by irradiating with an actinic energy ray to form an image on the recording medium;
   a mist adsorbing portion that is disposed in the vicinity of the ink-jet head and that electrostatically adsorbs an ink mist, that is produced when the ink droplet is ejected from the ink-jet head and that is attached to an area different from an area of the image on the recording medium if not adsorbed by the mist adsorbing portion; and an irradiating portion that irradiates the recording medium with the actinic energy ray, wherein the mist adsorbing portion is disposed between the ink-jet head and the irradiating portion, wherein the ink-jet recording device further comprises a shielding plate that prevents an electrode of the mist adsorbing portion from being irradiated with the actinic energy ray, and wherein the electrode is applied a voltage used for electrostatically adsorbing the ink mist.

* * * * *